(12) United States Patent
Li et al.

(10) Patent No.: US 8,504,051 B2
(45) Date of Patent: Aug. 6, 2013

(54) METHOD, SYSTEM AND DEVICE FOR INSTRUCTING TRANSMISSION OF PREAMBLE AND FOR TRANSMITTING PREAMBLE

(75) Inventors: Guoqing Li, Beijing (CN); Li Chen, Beijing (CN); Jiayi Fang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 193 days.

(21) Appl. No.: 13/057,363

(22) PCT Filed: Aug. 7, 2009

(86) PCT No.: PCT/CN2009/000903
§ 371 (c)(1),
(2), (4) Date: Mar. 7, 2011

(87) PCT Pub. No.: WO2010/015150
PCT Pub. Date: Feb. 11, 2010

(65) Prior Publication Data
US 2011/0294513 A1    Dec. 1, 2011

(30) Foreign Application Priority Data
Aug. 7, 2008    (CN) .......................... 2008 1 0118216

(51) Int. Cl.
*H04W 72/00*    (2009.01)
(52) U.S. Cl.
USPC ....................................................... 455/450

(58) Field of Classification Search
USPC ............ 455/450, 451, 452.1–452.2; 370/329, 370/341
See application file for complete search history.

(56) References Cited

U.S. PATENT DOCUMENTS

2004/0202124 A1* 10/2004 Dick et al. .................... 370/329
2010/0216483 A1* 8/2010 Tynderfeldt et al. .......... 455/450

FOREIGN PATENT DOCUMENTS

| CN | 1327697 | 12/2001 |
|---|---|---|
| CN | 1381153 | 11/2002 |
| WO | 01/74107 | 10/2001 |
| WO | WO 2007/052888 A2 * | 5/2007 |
| WO | 2007/078165 | 7/2007 |

OTHER PUBLICATIONS

International Search Report for International Application No. PCT/CN2009/000903, dated Oct. 22, 2009.

* cited by examiner

*Primary Examiner* — Brandon Miller
(74) *Attorney, Agent, or Firm* — Barnes & Thornburg LLP (57) ABSTRACT

A method, a system and a device for indicating and transmitting the preamble are used to solve the problem existing in the prior art, which reduces the resource utilization efficiency due to that the user equipment (UE) sends the preamble to the evolution base station through the physical random access channel (PRACH) selected by itself in the present random access. The method includes: determining the channel signature associated with the PRACH assigned to the terminal side; sending the determined channel signature to the terminal side, and indicating the terminal side to transmit the preamble using the PRACH associated with the channel signature. Adopting said method can improve the resource utilization efficiency.

9 Claims, 5 Drawing Sheets

METHOD, SYSTEM AND DEVICE FOR INSTRUCTING TRANSMISSION OF PREAMBLE AND FOR TRANSMITTING PREAMBLE

CROSS-REFERENCE TO RELATED APPLICATIONS

The present application is a US National Stage of International Application No. PCT/CN2009/000903, filed 7 Aug. 2009, designating the United States, and claiming priority to Chinese Patent Application No. 200810118216.2 filed 7 Aug. 2008.

FIELD OF THE INVENTION

The present invention relates to the field of wireless communications and particularly to a method, system and device for instructing transmission of a preamble and for transmitting a preamble.

BACKGROUND OF THE INVENTION

A random access is an important function of a modern cellular mobile communication system, and in numerous scenarios, a subsequent operation can proceed only after a random access function is performed.

A non-contention random access process in an existing Long Term Evolution (LTE) system is as follows.

Figure 1:
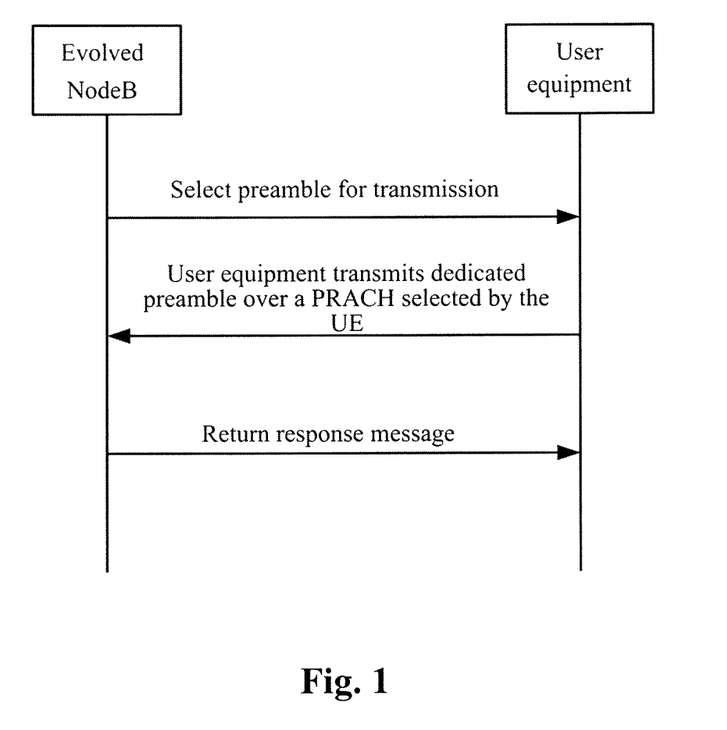
FIG. 1 is a schematic diagram of a non-contention random access process in an LTE system in the prior art.

As illustrated in FIG. 1, an evolved NodeB (eNodeB) selects a dedicated preamble for a User Equipment (UE), and the UE provided with the dedicated preamble transmits the dedicated preamble over a Physical Random Access Channel (PRACH) selected by the UE.

The eNodeB can control the dedicated preamble to be used only by the UE, therefore, a collision is avoided, the probability of a successful random access of the UE is improved and a delay of the access is reduced effectively.

At present, no specific PRACH resource is designated when the dedicated preamble is allocated, and the UE may select randomly the PRACH resource, which means that a collision can be avoided absolutely only if the dedicated preamble over all of PRACHs is allocated to the UE during a valid period of the dedicated preamble. However, the UE may finally select only one of the PRACHs for transmission of the dedicated preamble, therefore, the dedicated preamble over the other PRACH resources is indeed wasted.

In summary, resources are utilized inefficiently because the UE selects the PRACH resource for transmission of the dedicated preamble allocated by the eNodeB during a random access in the prior art.

SUMMARY OF THE INVENTION

Embodiments of the invention provide a method, system and device for instructing transmission of a preamble and for transmitting a preamble, to address the problem in the prior art of inefficient utilization of resources because a user equipment transmits a preamble to an evolved NodeB over a physical random access channel selected by the UE during a random access.

An embodiment of the invention provides a method for instructing a UE to transmit a preamble, the method includes:

determining a channel identifier corresponding to a physical random access channel allocated to the UE side; and transmitting the determined channel identifier to the UE side to instruct the UE side to transmit a preamble over the physical random access channel corresponding to the channel identifier.

An embodiment of the invention provides a method for transmitting a preamble, the method includes:

determining a corresponding physical random access channel according to a received channel identifier from the network side; and transmitting a preamble over the determined physical random access channel.

An embodiment of the invention provides a system for transmitting a preamble, the system includes:

a base station configured to determine a channel identifier corresponding to a physical random access channel allocated to a user equipment and transmit the determined channel identifier to the user equipment; and the user equipment configured to determine the corresponding physical random access channel according to the received channel identifier and transmit a preamble over the determined physical random access channel.

An embodiment of the invention provides a base station including:

a channel identifier determination module configured to determine a channel identifier corresponding to a physical random access channel allocated to a user equipment; and a channel identifier transmission module configured to transmit the determined channel identifier to the user equipment to instruct the user equipment to transmit a preamble over the physical random access channel corresponding to the channel identifier.

An embodiment of the invention provides a user equipment including:

an access channel determination module configured to determine a corresponding physical random access channel according to a received channel identifier from a base station; and a preamble transmission module configured to transmit a preamble over the determined physical random access channel.

In the embodiments of the invention, the channel identifier corresponding to the physical random access channel allocated to the UE side is determined and transmitted to the UE side, to instruct the UE side to transmit the preamble over the physical random access channel corresponding to the channel identifier. Since a physical random access channel may be designated, a dedicated preamble corresponds to a plurality of physical random access channels, and the user equipment transmits the preamble over the designated physical random access channel, thus improving the efficiency of utilizing resources and the flexibility of the system.

DETAILED DESCRIPTION OF THE EMBODIMENTS

In the embodiments of the invention, the network side allocates a physical random access channel to the UE side and transmits a channel identifier corresponding to the physical random access channel to the UE side, and the UE side transmits a preamble over the physical random access channel corresponding to the received channel identifier. The physical random access channel can be designated, therefore the efficiency of utilizing resources and the flexibility of the system are improved.

The embodiments of the invention are further detailed hereinafter with reference to the drawings.

Figure 2:
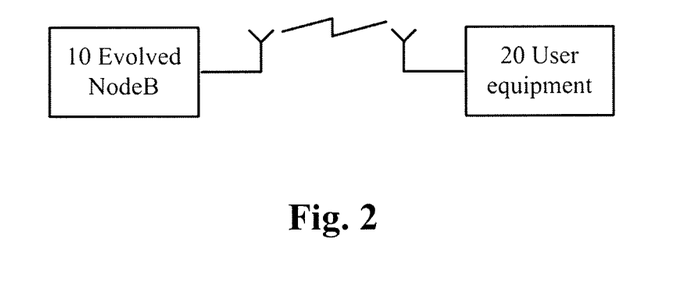
FIG. 2 is a schematic structural diagram of a system for transmitting a preamble according to an embodiment of the invention.

As illustrated in FIG. 2, a system for transmitting a preamble according to an embodiment of the invention includes an evolved NodeB 10 and a user equipment 20.

The evolved NodeB 10 is configured to determine a channel identifier corresponding to a physical random access channel allocated to the user equipment 20 and transmit the determined channel identifier to the user equipment 20.

The user equipment 20 is configured to determine the corresponding physical random access channel according to the received channel identifier from the evolved NodeB 10 and transmit a preamble over the determined physical random access channel.

Figure 3:
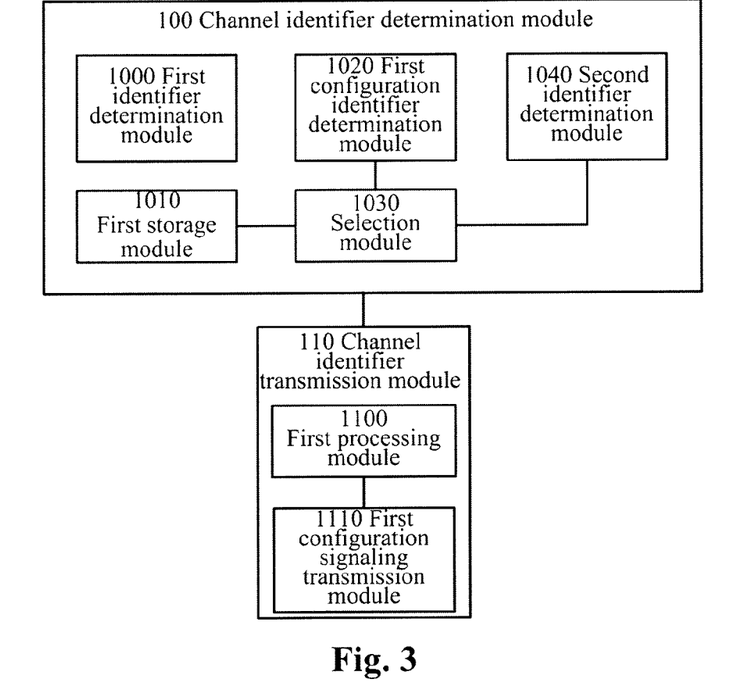
FIG. 3 is a schematic structural diagram of an evolved NodeB according to an embodiment of the invention.

As illustrated in FIG. 3, an evolved NodeB according to an embodiment of the invention includes a channel identifier determination module 100 and a channel identifier transmission module 110.

The channel identifier determination module 100 is configured to determine a channel identifier corresponding to a physical random access channel allocated to a user equipment.

The channel identifier may be retrieved according to a preset correspondence relationship, and then the channel identifier determination module 100 may further include a first identifier determination module 1000.

The first identifier determination module 1000 is configured to determine the channel identifier corresponding to the physical random access channel allocated to the user equipment according to a preset correspondence relationship between physical random access channels and channel identifiers.

In a specific implementation, the correspondence relationship between the physical random access channels and the channel identifiers may be stored in the form of a database or a file or in other forms into the evolved NodeB according to the present embodiment or into another entity for retrieval by the evolved NodeB according to the present embodiment.

The channel identifier may alternatively be retrieved according to a preset channel parameter arrangement sequence, and then the channel identifier determination module 100 may further include a first storage module 1010, a first configuration identifier determination module 1020, a selection module 1030 and a second identifier determination module 1040.

The first storage module 1010 is configured to store a physical random access channel configuration table.

The physical random access channel configuration table is prescribed in Technical Specification (TS) 36.211 Physical Channels and Modulation, the physical random access channel configuration table includes a physical random access channel configuration table in LTE Frequency Division Duplex (FDD) and a physical random access channel configuration table in LTE Time Division Duplex (TDD).

The first storage module 1010 may store physical random access channel configuration tables of both the LTE FDD and the LTE TDD, or store either of them dependent upon an application context.

The first configuration identifier determination module 1020 is configured to determine a physical random access channel configuration identifier.

A method for determining the physical random access channel configuration identifier includes but is not limited to one of the following methods.

The physical random access channel configuration identifier is preconfigured; or the physical random access channel configuration identifier is determined according to the corresponding physical random access channel configuration table dependent upon the application context (i.e., LTE FDD or LTE TDD).

The selection module 1030 is configured to retrieve physical random access channel parameters corresponding to the determined physical random access channel configuration identifier from the stored physical random access channel configuration table and select one of the physical random access channel parameters.

A physical random access channel configuration identifier may correspond to one or more physical random access channel parameters, and the selection module 1030 shall select one of the physical random access channel parameters corresponding to the physical random access channel configuration identifier as a physical random access channel parameter corresponding to the physical random access channel allocated to the user equipment.

Taking the LTE FDD as an example, it is assumed that the physical random access channel configuration identifier is 12, referring to Table 1, contents in the physical random access channel configuration table corresponding to the physical random access channel configuration identifier 12 are shown.

TABLE 1

| Physical random access channel configuration identifier | System frame serial number | Sub-frame serial number |
|---|---|---|
| 12 | Any | 0, 2, 4, 6, 8 |

There is one physical random access channel for one sub-frame in the LTE FDD, therefore, a sub-frame serial number may be a physical random access channel parameter. In other words, there are 5 physical random access channel parameters corresponding to the physical random access channel configuration identifier 12 in the LTE FDD.

The selection module 1030 shall select one of the 5 physical random access channel parameters.

Taking the LTE TDD as an example, it is assumed that the physical random access channel configuration identifier is 18, referring to Table 2, contents in the physical random access channel configuration table corresponding to the physical random access channel configuration identifier 18 are shown.

TABLE 2

| Physical random access channel configuration identifier | Uplink and downlink configuration | | | | | | |
|---|---|---|---|---|---|---|---|
| | 0 | 1 | 2 | 3 | 4 | 5 | 6 |
| 18 | (0, 0, 0, 2) | (0, 0, 0, 1) | (0, 0, 0, 0) | (0, 0, 0, 2) | (0, 0, 0, 1) | (0, 0, 0, 0) | (0, 0, 0, 2) |
| | (0, 0, 1, 2) | (0, 0, 1, 1) | (0, 0, 1, 0) | (0, 0, 0, 1) | (0, 0, 0, 0) | (1, 0, 0, 0) | (0, 0, 0, 1) |
| | (0, 0, 0, 1) | (0, 0, 0, 0) | (1, 0, 0, 0) | (0, 0, 0, 0) | (1, 0, 0, 1) | (2, 0, 0, 0) | (0, 0, 0, 1) |
| | (0, 0, 1, 1) | (0, 0, 1, 0) | (1, 0, 1, 0) | (1, 0, 0, 2) | (1, 0, 0, 0) | (3, 0, 0, 0) | (0, 0, 1, 0) |
| | (0, 0, 0, 0) | (1, 0, 0, 1) | (2, 0, 0, 0) | (1, 0, 0, 1) | (2, 0, 0, 1) | (4, 0, 0, 0) | (0, 0, 0, 0) |
| | (0, 0, 1, 0) | (1, 0, 1, 1) | (2, 0, 1, 0) | (1, 0, 0, 0) | (2, 0, 0, 0) | (5, 0, 0, 0) | (1, 0, 0, 2) |

There may be a plurality of physical random access channels for one sub-frame in the LTE TDD, and it can be seen from Table 2 that there are 42 physical random access channel parameters corresponding to the physical random access channel configuration identifier 18 in the LTE TDD.

The selection module 1030 further selects one of the 42 physical random access channel parameters according to the uplink and downlink configuration. For example, one of (0,0,0,1), (0,0,0,0), (1,0,0,1), (1,0,0,0), (2,0,0,1) and (2,0,0,0) is selected if the uplink and downlink configuration is 4.

The second identifier determination module 1040 is configured to determine a location identifier of the selected physical random access channel parameter according to a preset channel parameter arrangement sequence as the channel identifier corresponding to the physical random access channel.

The channel parameter arrangement sequence may be preset as required.

For example, the channel parameter arrangement sequence may be determined in a mode of firstly in frequency domain and then in time domain.

Figure 7:
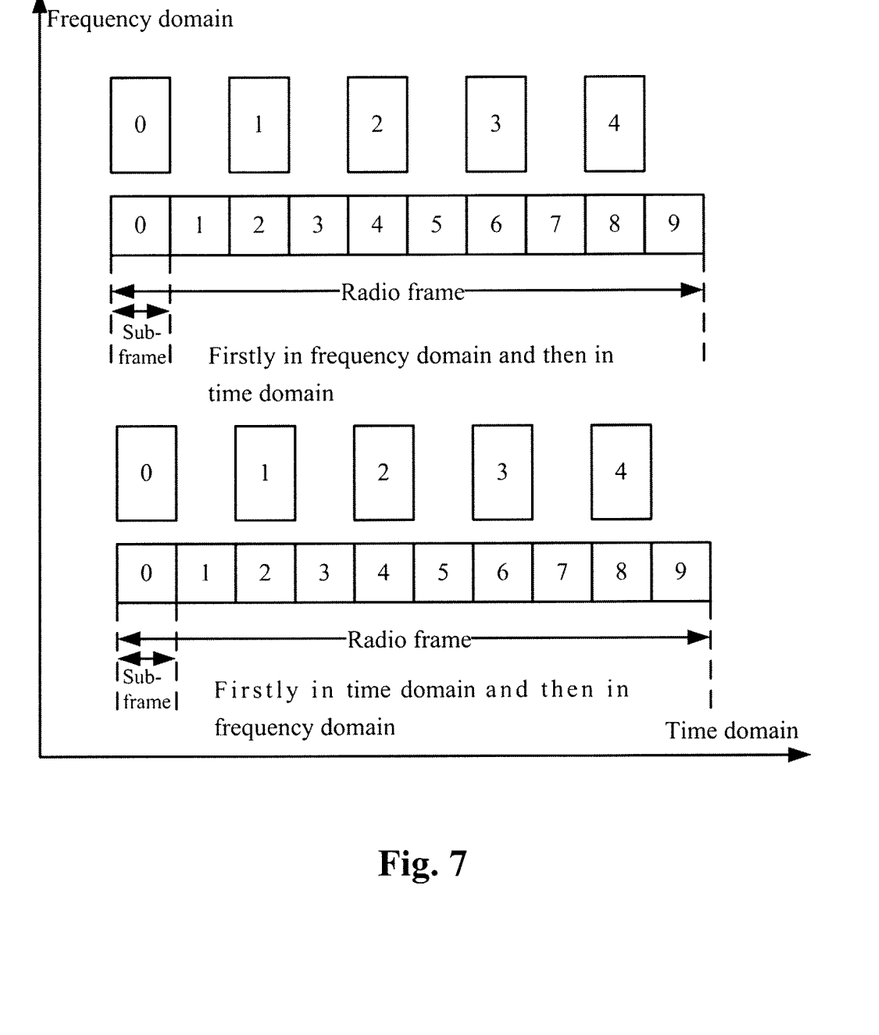
FIG. 7 is a schematic diagram of physical random access channel parameters ranked in the time and frequency domains in LTE FDD according to an embodiment of the invention.

For example, in Table 1:

location identifiers corresponding to the sub-frame serial numbers 0, 2, 4, 6 and 8 are 0, 1, 2, 3 and 4 respectively with reference to FIG. 7.

Figure 8:
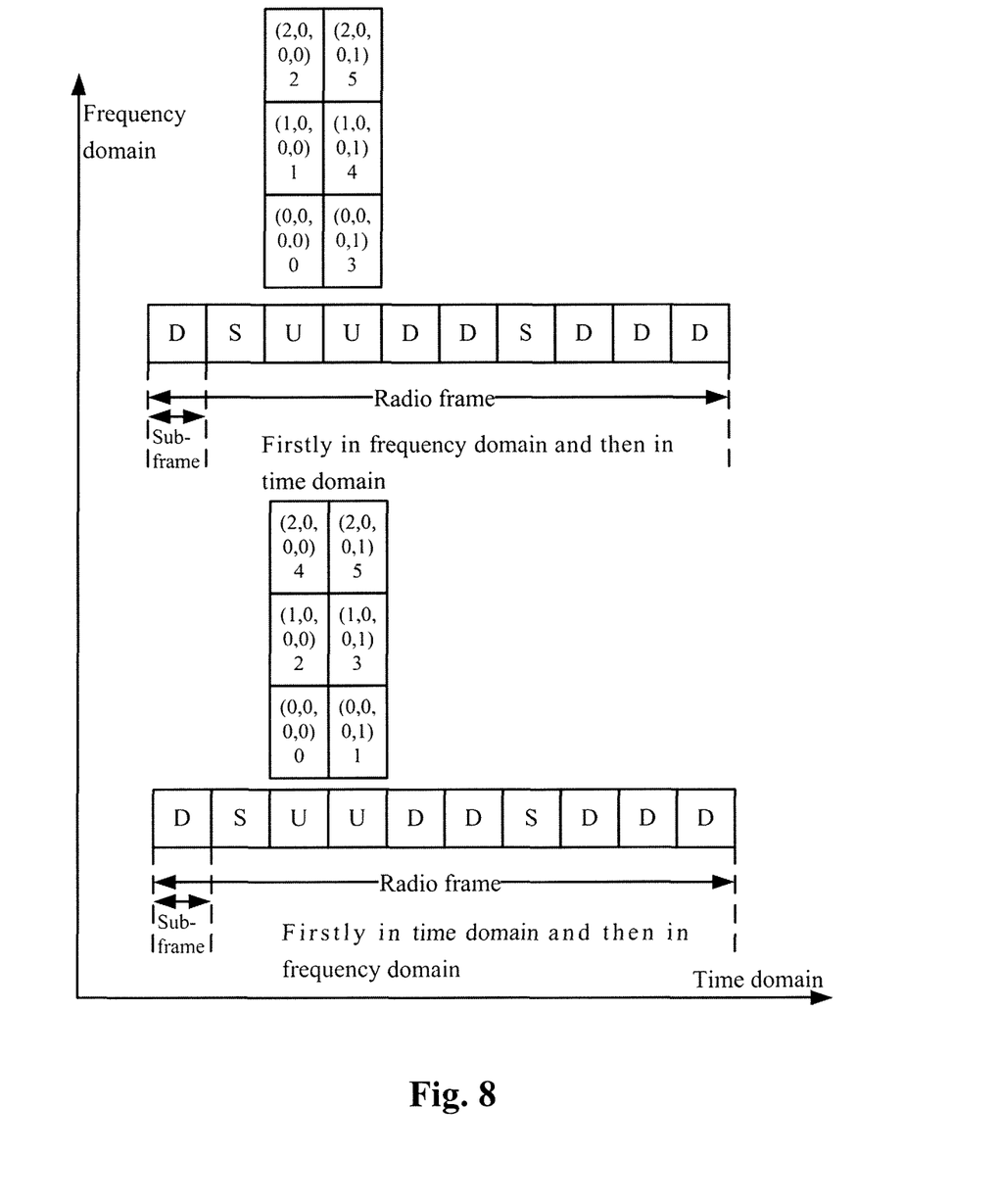
FIG. 8 is a schematic diagram of physical random access channel parameters ranked in the time and frequency domains in LTE TDD according to an embodiment of the invention

For example, in Table 2:

location identifiers corresponding to (0,0,0,1), (0,0,0,0), (1,0,0,1), (1,0,0,0), (2,0,0,1) and (2,0,0,0) are 3, 0, 4, 1, 5 and 2 respectively with reference to FIG. 8.

Alternatively, the channel parameter arrangement sequence may be determined in a mode of firstly in time domain and then in frequency domain.

For example, in Table 1:

location identifiers corresponding to the sub-frame serial numbers 0, 2, 4, 6 and 8 are 0, 1, 2, 3 and 4 respectively with reference to FIG. 7. It can be seen from FIG. 7 that the channel parameter arrangement sequence in the mode of firstly in frequency domain and then in time domain is the same as that in the mode of firstly in time domain and then in frequency domain.

For example, in Table 2:

location identifiers corresponding to (0,0,0,1), (0,0,0,0), (1,0,0,1), (1,0,0,0), (2,0,0,1) and (2,0,0,0) are 1, 0, 3, 2, 5 and 4 respectively with reference to FIG. 8.

A location identifier may alternatively be represented with two values, i.e., a row value and a column value. Taking Table 2 as an example, the first value in the location identifier is a row value, and the second value in the location identifier is a column value. If the channel parameter arrangement sequence is firstly from left to right and then from up to down for all of uplink and downlink configurations, location identifiers corresponding to (0,0,0,1), (0,0,0,0), (1,0,0,1), (1,0,0,0), (2,0,0,1) and (2,0,0,0) may be (49, 5), (50, 5), (51, 5), (52, 5), (53, 5) and (54, 5) respectively.

If the channel parameter arrangement sequence is firstly in row and then in column for a single uplink and downlink configuration, location identifiers corresponding to (0,0,0,1), (0,0,0,0), (1,0,0,1), (1,0,0,0), (2,0,0,1) and (2,0,0,0) may be (1, 5), (2, 5), (3, 5), (4, 5), (5, 5) and (6, 5) respectively.

A location identifier including two values, i.e., a row value and a column value, may be otherwise allocated variously.

Taking Table 2 as an example, the first value in the location identifier is a row value and the second value in the location identifier is a column value, and the channel parameter arrangement sequence is firstly from left to right and then from down to up, for example. As with the locations of (0,0,0,1), (0,0,0,0), (1,0,0,1), (1,0,0,0), (2,0,0,1) and (2,0,0,0) illustrated in FIG. 8, (0,0,0,0), (1,0,0,0) and (2,0,0,0) in the third sub-frame may correspond to the column 3, and (0,0,0,1), (1,0,0,1) and (2,0,0,1) in the fourth sub-frame may correspond to the column 4, therefore, location identifiers corresponding to (0,0,0,1), (0,0,0,0), (1,0,0,1), (1,0,0,0), (2,0,0,1) and (2,0,0,0) may be (4, 1), (3, 1), (4, 2), (3, 2), (4, 3) and (3, 3) respectively.

It shall be noted that various other channel parameter arrangement sequences are possible in the case of Table 2, for example:

if a mode of firstly in row and then in column applies to all of uplink and downlink configurations, location identifiers corresponding to (0,0,0,1), (0,0,0,0), (1,0,0,1), (1,0,0,0), (2,0,0,1) and (2,0,0,0) are 5, 12, 19, 26, 33 and 40 respectively;

if a mode of firstly in column then in row and from up to down applies to all of uplink and downlink configurations, location identifiers corresponding to (0,0,0,1), (0,0,0,0), (1,0,0,1), (1,0,0,0), (2,0,0,1) and (2,0,0,0) are 25, 26, 27, 28, 29 and 30 respectively.

The channel parameter arrangement sequence may alternatively apply to a single uplink and downlink configuration. As may be apparent, the channel parameter arrangement sequence may be preset as required and may not be limited to the examples listed above.

The channel identifier transmission module 110 is configured to transmit the determined channel identifier to the user equipment to instruct the user equipment to transmit a preamble over the physical random access channel corresponding to the channel identifier.

The channel identifier transmission module 110 may further include a first processing module 1100 and a first configuration signaling transmission module 1110.

The first processing module 1100 is configured to put the determined channel identifier into configuration signaling.

The first configuration signaling transmission module 1110 is configured to transmit the configuration signaling processed by the first processing module 1100 to the user equipment.

The configuration signaling includes:

PRACH Index (3 bits) and Preamble Index (6 bits), where the Preamble Index indicates the dedicated preamble allocated to the user equipment, while the PRACH Index in the prior art has no indication, and herein the channel identifier may be put into the PRACH Index.

Referring to Table 3, for the physical random access channel configuration identifier 14 in the LTE FDD, there are 10 physical random access channels for a radio frame.

TABLE 3

| Physical random access channel configuration identifier | System frame serial number | Sub-frame serial number |
| --- | --- | --- |
| 14 | Any | 0, 1, 2, 3, 4, 5, 6, 7, 8, 9 |

Since 3 bits may carry 8 channel identifiers, it may be prescribed that the UE side shall select one of the first or last 8 channel identifiers, and in the latter case, channel identifiers corresponding to sub-frame serial numbers 2, 3, 4, 5, 6, 7, 8 and 9 are 0, 1, 2, 3, 4, 5, 6 and 7 respectively. Therefore, the PRACH Index may further be extended into 4 bits.

Figure 4:
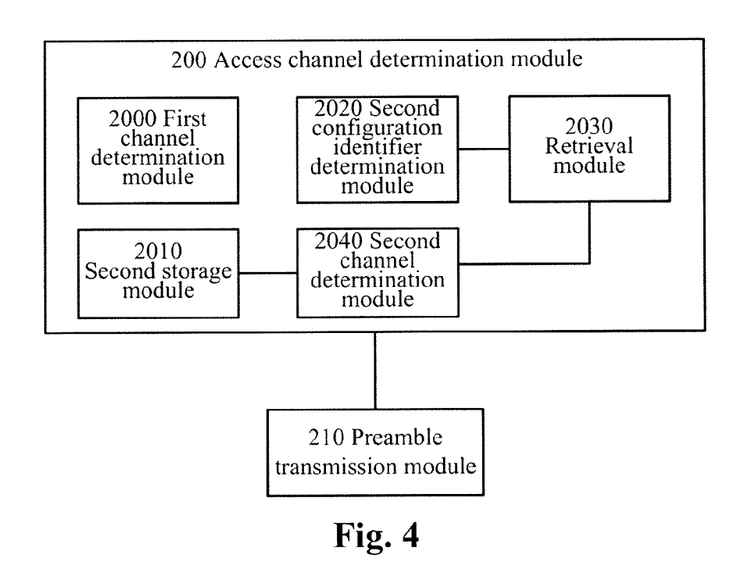
FIG. 4 is a schematic structural diagram of a user equipment according to an embodiment of the invention.

As illustrated in FIG. 4, a user equipment according to an embodiment of the invention includes an access channel determination module 200 and a preamble transmission module 210.

The access channel determination module 200 is configured to determine a corresponding physical random access channel according to a received channel identifier from an evolved NodeB.

The physical random access channel may be determined according to a preset correspondence relationship, and then the access channel determination module 200 may further include a first channel determination module 2000.

The first channel determination module 2000 is configured to determine the physical random access channel corresponding to the received channel identifier according to a preset correspondence relationship between physical random access channels and channel identifiers.

In a specific implementation, the correspondence relationship between the physical random access channels and the channel identifiers preset in the user equipment shall be the same as that preset in the evolved NodeB.

The channel identifier may alternatively be retrieved according to a preset channel parameter arrangement sequence, and then the access channel determination module 200 may further include a second storage module 2010, a second configuration identifier determination module 2020, a retrieval module 2030 and a second channel determination module 2040.

The second storage module 2010 is configured to store a physical random access channel configuration table.

The physical random access channel configuration table stored in the second storage module 2010 is the same as that stored in the first storage module 1010 in FIG. 3, and a repeated description thereof is omitted.

The second configuration identifier determination module 2020 is configured to determine a physical random access channel configuration identifier.

The second configuration identifier determination module 2020 determines the physical random access channel configuration identifier in the same way as that the first configuration identifier determination module 1020 in FIG. 3 determines the physical random access channel configuration identifier, and a repeated description thereof is omitted.

The retrieval module 2030 is configured to retrieve physical random access channel parameters corresponding to the physical random access channel configuration identifier from the stored physical random access channel configuration table.

For the LTE TDD, if the channel parameter arrangement sequence applies to a single uplink and downlink configuration, the physical random access channel parameters retrieved by the retrieval module 2030 are physical random access channel parameters corresponding to a current uplink and downlink configuration of the physical random access channel configuration identifier.

If the channel parameter arrangement sequence applies to all of uplink and downlink configurations, the physical random access channel parameters retrieved by the retrieval module 2030 are all of physical random access channel parameters corresponding to the physical random access channel configuration identifier.

Taking Table 2 as an example, when the channel parameter arrangement sequence applies to a single uplink and downlink configuration, it is assumed that the current uplink and downlink configuration is 4, the retrieved physical random access channel parameters are (0,0,0,1), (0,0,0,0), (1,0,0,1), (1,0,0,0), (2,0,0,1) and (2,0,0,0).

When the channel parameter arrangement sequence applies to all of uplink and downlink configurations, the retrieved physical random access channel parameters are all of 42 physical random access channel parameters.

The second channel determination module 2040 is configured to determine one of the retrieved physical random access channel parameters corresponding to the received channel identifier from the evolved NodeB according to the preset channel parameter arrangement sequence and determine the corresponding physical random access channel according to the determined physical random access channel parameter.

The preset channel parameter arrangement sequence is the same as the channel parameter arrangement sequence preset in the evolved NodeB, to ensure that the second channel determination module 2040 may determine accurately the corresponding physical random access channel.

If the mode of firstly in frequency domain and then in time domain applies to the evolved NodeB, the same mode also applies to the second channel determination module 2040; if the mode of firstly in time domain and then in frequency domain applies to the evolved NodeB, the same mode also applies to the second channel determination module 2040.

Taking Table 2 as an example, it is assumed that the channel identifier transmitted from the evolved NodeB is 3, the mode of firstly in frequency domain and then in time domain is employed, the physical random access channel parameters retrieved by the retrieval module 2030 are (0,0,0,1), (0,0,0,0), (1,0,0,1), (1,0,0,0), (2,0,0,1) and (2,0,0,0), and their corresponding location identifiers are 3, 0, 4, 1, 5 and 2 respectively.

Since the received channel identifier is 3 and its corresponding access channel parameter is (0,0,0,1), a physical random access channel corresponding to the access channel parameter (0,0,0,1) is finally determined as the desired physical random access channel.

The preamble transmission module 210 is configured to transmit a preamble over the physical random access channel determined by the access channel determination module 200.

It shall be noted that the user equipment shall retrieve the channel identifier in the same way as the evolved NodeB retrieves the channel identifier, that is, if the evolved NodeB retrieves the channel identifier according to the preset correspondence relationship between the physical random access channels and the channel identifiers, the user equipment shall also retrieve the channel identifier in the same way; and correspondingly, if the evolved NodeB retrieves the channel identifier according to the channel parameter arrangement sequence, the user equipment shall also retrieve the channel identifier in the same way.

Figure 5:
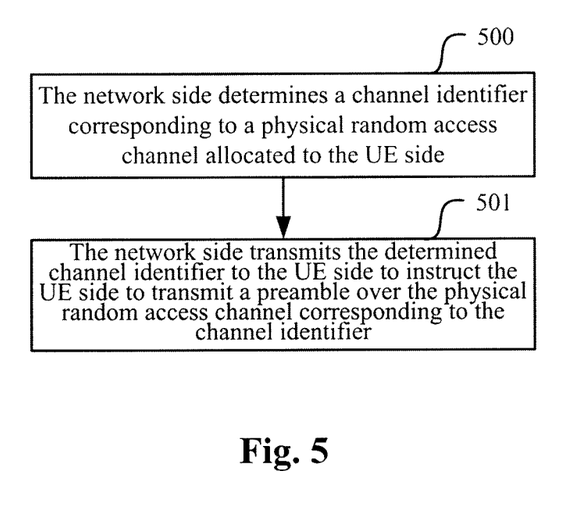
FIG. 5 is a schematic flow chart of a method for instructing a UE to transmit a preamble according to an embodiment of the invention.

As illustrated in FIG. 5, a method for instructing a user equipment to transmit a preamble according to an embodiment of the invention includes the following processes.

Process 500: the network side determines a channel identifier corresponding to a physical random access channel allocated to the UE side.

Process 501: the network side transmits the determined channel identifier to the UE side to instruct the UE side to transmit a preamble over the physical random access channel corresponding to the channel identifier.

The channel identifier may be retrieved according to a preset correspondence relationship, and then in Process 500, the channel identifier corresponding to the physical random access channel allocated to the UE side is determined according to a preset correspondence relationship between physical random access channels and channel identifiers.

In a specific implementation, the correspondence relationship between the physical random access channels and the channel identifiers may be stored in form of a database or a file or in other forms into an evolved NodeB at the network side according to the present embodiment or into another entity for retrieval by the evolved NodeB at the network side according to the present embodiment.

The channel identifier may alternatively be retrieved according to a preset channel parameter arrangement sequence, and then Process 500 may further include the following processes.

Process a500: the network side determines a physical random access channel configuration identifier.

Process b500: the network side retrieves physical random access channel parameters corresponding to the physical random access channel configuration identifier from a stored physical random access channel configuration table and selects one of the physical random access channel parameters.

Process c500: the network side determines a location identifier of the selected physical random access channel parameter according to a preset channel parameter arrangement sequence as the channel identifier.

The physical random access channel configuration table is prescribed in TS 36.211 Physical Channels and Modulation, the physical random access channel configuration table includes a physical random access channel configuration table in the LTE FDD and a physical random access channel configuration table in the LTE TDD. Physical random access channel configuration tables of both the LTE FDD and the LTE TDD may be stored, or either of them may be stored dependent upon an application context.

In Process a500: a method for determining the physical random access channel configuration identifier includes but is not limited to one of the following methods.

The physical random access channel configuration identifier is preconfigured; or the physical random access channel configuration identifier is determined according to the corresponding physical random access channel configuration table dependent upon the application context (i.e., LTE FDD or LTE TDD).

In Process b500: when the physical random access channel parameter is selected, a physical random access channel configuration identifier may correspond to one or more physical random access channel parameters, and one of the physical random access channel parameters corresponding to the physical random access channel configuration identifier shall be selected as a physical random access channel parameter corresponding to the physical random access channel allocated to the user equipment.

Taking the LTE FDD as an example, it is assumed that the physical random access channel configuration identifier is 12, referring to Table 1, contents in the physical random access channel configuration table corresponding to the physical random access channel configuration identifier 12 are shown. There is one physical random access channel for one sub-frame in the LTE FDD, therefore, a sub-frame serial number may be a physical random access channel parameter. In other words, there are 5 physical random access channel parameters corresponding to the physical random access channel configuration identifier 12 in the LTE FDD, and one of the 5 physical random access channel parameters shall be selected.

Taking the LTE TDD as an example, it is assumed that the physical random access channel configuration identifier is 18, referring to Table 2, contents in the physical random access channel configuration table corresponding to the physical random access channel configuration identifier 18 are shown.

There may be a plurality of physical random access channels for one sub-frame in the LTE TDD, and it can be seen from Table 2 that there are 42 physical random access channel parameters corresponding to the physical random access channel configuration identifier 18 in the LTE TDD.

Then one of the 42 physical random access channel parameters is selected according to the uplink and downlink configuration. For example, one of (0,0,0,1), (0,0,0,0), (1,0,0,1), (1,0,0,0), (2,0,0,1) and (2,0,0,0) is selected if the uplink and downlink configuration is 4.

In Process c500: the channel parameter arrangement sequence may be preset as required.

For example, the channel parameter arrangement sequence may be determined in a mode of firstly in frequency domain and then in time domain.

For example, in Table 1:

location identifiers corresponding to the sub-frame serial numbers 0, 2, 4, 6 and 8 are 0, 1, 2, 3 and 4 respectively with reference to FIG. 7.

For example, in Table 2:

location identifiers corresponding to (0,0,0,1), (0,0,0,0), (1,0,0,1), (1,0,0,0), (2,0,0,1) and (2,0,0,0) are 3, 0, 4, 1, 5 and 2 respectively with reference to FIG. 8.

Alternatively, the channel parameter arrangement sequence may be determined in a mode of firstly in time domain and then in frequency domain.

For example, in Table 1:

location identifiers corresponding to the sub-frame serial numbers 0, 2, 4, 6 and 8 are 0, 1, 2, 3 and 4 respectively with reference to FIG. 7. It can be seen from FIG. 7 that the channel parameter arrangement sequence in the mode of firstly in frequency domain and then in time domain is the same as that in the mode of firstly in time domain and then in frequency domain.

For example, in Table 2:

location identifiers corresponding to (0,0,0,1), (0,0,0,0), (1,0,0,1), (1,0,0,0), (2,0,0,1) and (2,0,0,0) are 1, 0, 3, 2, 5 and 4 respectively with reference to FIG. 8.

A location identifier may alternatively be represented with two values, i.e., a row value and a column value. Taking Table 2 as an example, the first value in the location identifier is a row value, and the second value in the location identifier is a column value, for example. If the channel parameter arrangement sequence is firstly from left to right and then from up to down for all of uplink and downlink configurations, location identifiers corresponding to (0,0,0,1), (0,0,0,0), (1,0,0,1), (1,0,0,0), (2,0,0,1) and (2,0,0,0) may be (49, 5), (50, 5), (51, 5), (52, 5), (53, 5) and (54, 5) respectively.

If the channel parameter arrangement sequence is firstly in row and then in column for a single uplink and downlink configuration, location identifiers corresponding to (0,0,0,1), (0,0,0,0), (1,0,0,1), (1,0,0,0), (2,0,0,1) and (2,0,0,0) may be (1,5), (2,5), (3,5), (4,5), (5,5) and (6,5) respectively.

A location identifier including two values, i.e., a row value and a column value, may be otherwise allocated variously.

Taking Table 2 as an example, the first value in the location identifier is a row value and the second value in the location identifier is a column value, and the channel parameter arrangement sequence is firstly from left to right and then from down to up, for example. As with the locations of (0,0,0,1), (0,0,0,0), (1,0,0,1), (1,0,0,0), (2,0,0,1) and (2,0,0,0) illustrated in FIG. 8, (0,0,0,0), (1,0,0,0) and (2,0,0,0) in the third sub-frame may correspond to the column 3, and (0,0,0,1), (1,0,0,1) and (2,0,0,1) in the fourth sub-frame may correspond to the column 4, therefore, location identifiers corresponding to (0,0,0,1), (0,0,0,0), (1,0,0,1), (1,0,0,0), (2,0,0,1) and (2,0,0,0) may be (4, 1), (3, 1), (4, 2), (3, 2), (4, 3) and (3, 3) respectively.

It shall be noted that various other channel parameter arrangement sequences are possible in the case of Table 2, for example:

if a mode of firstly in row and then in column applies to all of uplink and downlink configurations, location identifiers corresponding to (0,0,0,1), (0,0,0,0), (1,0,0,1), (1,0,0,0), (2,0,0,1) and (2,0,0,0) are 5, 12, 19, 26, 33 and 40 respectively;

if a mode of firstly in column then in row and from up to down applies to all of uplink and downlink configurations, location identifiers corresponding to (0,0,0,1), (0,0,0,0), (1,0,0,1), (1,0,0,0), (2,0,0,1) and (2,0,0,0) are 25, 26, 27, 28, 29 and 30 respectively.

The channel parameter arrangement sequence may alternatively apply to a single uplink and downlink configuration. As may be apparent, the channel parameter arrangement sequence may be preset as required and may not be limited to the examples listed above.

In Process 501: the channel identifier may be put into configuration signaling and the configuration signaling is transmitted to the UE side.

The configuration signaling includes:

PRACH Index (3 bits) and Preamble Index (6 bits), where the Preamble Index indicates the dedicated preamble allocated to the user equipment, while the PRACH Index in the prior art has no indication, and herein the channel identifier may be put into the PRACH Index.

Referring to Table 3, for the physical random access channel configuration identifier 14 in the LTE FDD, there are 10 physical random access channels for a radio frame.

Since 3 bits may carry 8 channel identifiers, it may be prescribed that the UE side shall select one of the first or last 8 channel identifiers, and in the latter case, channel identifiers corresponding to sub-frame serial numbers 2, 3, 4, 5, 6, 7, 8 and 9 are 0, 1, 2, 3, 4, 5, 6 and 7 respectively. Therefore, the PRACH Index may further be extended into 4 bits.

The following processes may further be included prior to Process 500.

Process S1: the network side determines whether a physical random access channel is designated, and if so, the process goes to Process 500; otherwise, the process goes to Process S2.

Process S2: the network side transmits information instructing the UE side to select a physical random access channel.

In Process S2, the information instructing the UE side to select a physical random access channel may be put into configuration signaling to transmit to the UE side.

In a specific implementation, a 3-bit code in the PRACH Index, e.g., 111, may be used as the instruction information instructing the UE side to select a physical random access channel, and if a 3-bit code is used as the instruction information, it shall be prescribed that one of the first or last 7 channel identifiers shall be selected in the case of Table 3. Thus, the instruction information may also be regarded as a channel identifier of a physical random access channel, however, the channel identifier may correspond to a plurality of physical random access channels, and the UE side may select one of the corresponding physical random access channels according to the channel identifier.

Alternatively, a 4-bit code in the extended PRACH Index, e.g., 1111, may be used as the instruction information.

Alternatively, no information is added to the PRACH Index (that is, no modification is made to the configuration signaling in the prior art), and if the PRACH Index includes no information, it is considered that the user equipment is instructed to select a physical random access channel.

Figure 6:
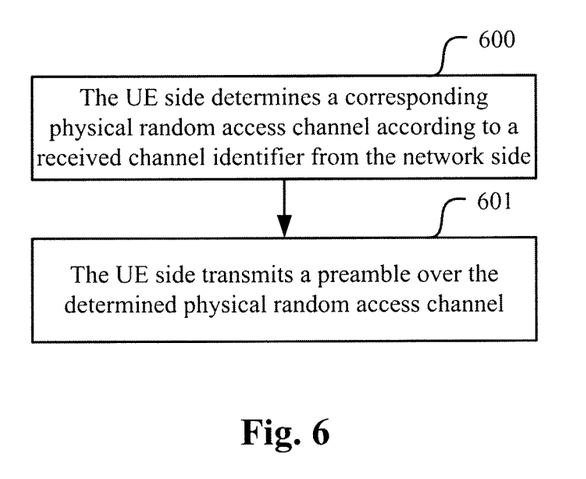
FIG. 6 is a schematic flow chart of a method for transmitting a preamble according to an embodiment of the invention.

As illustrated in FIG. 6, a method for transmitting a preamble according to an embodiment of the invention includes the following processes.

Process 600: the UE side determines a corresponding physical random access channel according to a received channel identifier from the network side.

Process 601: the UE side transmits a preamble over the determined physical random access channel.

The physical random access channel may be determined according to a preset correspondence relationship, and then in Process 600, the physical random access channel corresponding to the received channel identifier is determined according to a preset correspondence relationship between physical random access channels and channel identifiers.

In a specific implementation, the correspondence relationship between the physical random access channels and the channel identifiers preset at the UE side shall be the same as that preset at the network side.

The channel identifier may alternatively be retrieved according to a preset channel parameter arrangement sequence, and then Process 600 may further include the following processes.

Process a600: a physical random access channel configuration identifier is determined.

Process b600: physical random access channel parameters corresponding to the physical random access channel configuration identifier are retrieved from a stored physical random access channel configuration table.

Process c600: one of the retrieved physical random access channel parameters corresponding to the received channel identifier from the network side is determined according to the preset channel parameter arrangement sequence.

Process d600: the corresponding physical random access channel is determined according to the determined physical random access channel parameter.

The physical random access channel configuration table stored at the UE side is the same as that stored at the network side in FIG. 5, and a repeated description thereof is omitted.

The physical random access channel configuration identifier is determined in Process a600 in the same way as that the physical random access channel configuration identifier is determined in FIG. 5, and a repeated description thereof is omitted here.

For the LTE TDD, if the channel parameter arrangement sequence applies to a single uplink and downlink configuration, the physical random access channel parameters retrieved in Process b600 are physical random access channel parameters corresponding to a current uplink and downlink configuration of the physical random access channel configuration identifier.

If the channel parameter arrangement sequence applies to all of uplink and downlink configurations, the physical random access channel parameters retrieved in Process b600 are all of physical random access channel parameters corresponding to the physical random access channel configuration identifier.

Taking Table 2 as an example, when the channel parameter arrangement sequence applies to a single uplink and downlink configuration, it is assumed that the current uplink and downlink configuration is 4, the physical random access channel parameters retrieved in the step b600 are (0,0,0,1), (0,0,0,0), (1,0,0,1), (1,0,0,0), (2,0,0,1) and (2,0,0,0).

When the channel parameter arrangement sequence applies to all of uplink and downlink configurations, the physical random access channel parameters retrieved in Process b600 are all of 42 physical random access channel parameters.

In Process c600, the preset channel parameter arrangement sequence is the same as the channel parameter arrangement sequence preset at the network side, to ensure that the corresponding physical random access channel may be determined accurately.

If the mode of firstly in frequency domain and then in time domain applies to the network side, the same mode also applies to Process c600; if the mode of firstly in time domain and then in frequency domain applies to the network side, the same mode also applies to Process c600.

Taking Table 2 as an example, it is assumed that the channel identifier transmitted from the network side is 3, the mode of firstly in frequency domain and then in time domain is employed, the physical random access channel parameters retrieved in Process c600 are (0,0,0,1), (0,0,0,0), (1,0,0,1), (1,0,0,0), (2,0,0,1) and (2,0,0,0), and their corresponding location identifiers are 3, 0, 4, 1, 5 and 2 respectively.

Since the received channel identifier is 3 and its corresponding access channel parameter is (0,0,0,1), a physical random access channel corresponding to the access channel parameter (0,0,0,1) is finally determined as the desired physical random access channel.

It shall be noted that the UE side shall retrieve the channel identifier in the same way as the network side retrieves the channel identifier, that is, if the network side retrieves the channel identifier according to the preset correspondence relationship between the physical random access channels and the channel identifiers, the UE side shall also retrieve the channel identifier in the same way; and correspondingly, if the network side retrieves the channel identifier according to the channel parameter arrangement sequence, the UE side shall also retrieve the channel identifier in the same way.

As may be apparent from the foregoing embodiments, the channel identifier corresponding to the physical random access channel PRACH allocated to the UE side is determined and transmitted to the UE side, to instruct the UE side to transmit the preamble over the physical random access channel corresponding to the channel identifier. Since a physical random access channel may be designated, a dedicated preamble corresponds to a plurality of physical random access channels, and the user equipment transmits the preamble over the designated physical random access channel, thus improving the efficiency of utilizing resources and the flexibility of the system.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A method for instructing a UE to transmit a preamble, comprising:
    determining a channel identifier corresponding to a physical random access channel allocated to the UE side; and
    transmitting the determined channel identifier to the UE side to instruct the UE side to transmit a preamble over the physical random access channel corresponding to the channel identifier,
    wherein determining a channel identifier corresponding to a physical random access channel allocated to the UE side comprises:
    determining a physical random access channel configuration identifier;
    retrieving physical random access channel parameters corresponding to the physical random access channel configuration identifier from a stored physical random access channel configuration table and selecting one of the physical random access channel parameters; and
    determining a location identifier of the selected physical random access channel parameter according to a preset channel parameter arrangement sequence as the channel identifier.

2. The method of claim 1, wherein determining a channel identifier corresponding to a physical random access channel allocated to the UE side comprises:
    determining the channel identifier corresponding to the physical random access channel allocated to the UE side according to a preset correspondence relationship between physical random access channels and channel identifiers.

3. The method of claim 1, wherein the channel parameter arrangement sequence is determined in a mode of firstly in time domain and then in frequency domain.

4. The method of claim 1, wherein transmitting the determined channel identifier to the UE side comprises:
    putting the determined channel identifier into configuration signaling to transmit to the UE side.

5. The method of claim 1, wherein the channel identifier corresponds to a plurality of physical random access channels.

6. A method for transmitting a preamble, comprising:
    determining a corresponding physical random access channel according to a received channel identifier from the network side; and
    transmitting a preamble over the determined physical random access channel,
    wherein determining a corresponding physical random access channel comprises:
    determining a physical random access channel configuration identifier;
    retrieving physical random access channel parameters corresponding to the physical random access channel configuration identifier from a stored physical random access channel configuration table;
    determining one of the retrieved physical random access channel parameters corresponding to the received channel identifier from the network side according to a preset channel parameter arrangement sequence; and determining the corresponding physical random access channel according to the physical random access channel parameter.

7. The method of claim 6, wherein determining a corresponding physical random access channel comprises:
   determining the physical random access channel corresponding to the received channel identifier according to a preset correspondence relationship between physical random access channels and channel identifiers.

8. The method of claim 6, wherein the channel parameter arrangement sequence is determined in a mode of firstly in time domain and then in frequency domain.

9. The method of claim 6, wherein the channel identifier corresponds to a plurality of physical random access channels, and then selecting one of the corresponding physical random access channels according to the channel identifier, and transmitting the preamble over the selected physical random access channel.

* * * * *